(12) United States Patent
Choi et al.

(10) Patent No.: US 8,624,874 B2
(45) Date of Patent: Jan. 7, 2014

(54) PHOTO SENSING DEVICE, PHOTO SENSING CIRCUIT, TOUCH PANEL, AND METHOD OF SENSING OUTPUT VALUE OF PHOTO SENSING ELEMENT

(75) Inventors: Deok-Young Choi, Yongin (KR); Yong-Sung Park, Yongin (KR); Do-Youb Kim, Yongin (KR); Soon-Sung Ahn, Yongin (KR); In-Ho Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 901 days.

(21) Appl. No.: 12/568,055

(22) Filed: Sep. 28, 2009

(65) Prior Publication Data

US 2010/0097350 A1    Apr. 22, 2010

(30) Foreign Application Priority Data

Oct. 20, 2008    (KR) .................. 10-2008-0102557

(51) Int. Cl.
*G06F 3/042*    (2006.01)
(52) U.S. Cl.
USPC .............. 345/175; 345/207; 345/98; 345/173
(58) Field of Classification Search
USPC ........... 345/175, 76, 207, 98, 173; 73/863.01; 313/506; 348/308; 257/292; 250/208.1, 250/559.22, 214
See application file for complete search history.

(56) References Cited

U.S. PATENT DOCUMENTS

| | | | | |
|---|---|---|---|---|
| 4,982,102 A * | 1/1991 | Inoue et al. | ............... | 250/559.22 |
| 5,400,664 A * | 3/1995 | Kio | .............. | 73/863.01 |
| 6,677,993 B1 | 1/2004 | Suzuki et al. | | |
| 6,888,571 B1 | 5/2005 | Koshizuka et al. | | |
| 7,250,592 B2 * | 7/2007 | Kim | ............. | 250/208.1 |
| 7,843,132 B2 * | 11/2010 | Choi | ............. | 313/506 |
| 2006/0033016 A1 | 2/2006 | Ogawa et al. | | |
| 2006/0097976 A1 * | 5/2006 | Lee et al. | ............. | 345/98 |
| 2008/0054164 A1 * | 3/2008 | Johansson | ............. | 250/214 R |
| 2008/0157151 A1 * | 7/2008 | Jang | ............. | 257/292 |
| 2008/0272989 A1 * | 11/2008 | Takahashi et al. | ............. | 345/76 |
| 2009/0008685 A1 * | 1/2009 | Jung | ............. | 257/292 |
| 2009/0251583 A1 * | 10/2009 | Kim et al. | ............. | 348/308 |

FOREIGN PATENT DOCUMENTS

| | | |
|---|---|---|
| KR | 10-0579685 | 5/2006 |
| KR | 10-0659620 | 12/2006 |
| KR | 10-2009-0072779 | 7/2009 |

OTHER PUBLICATIONS

English-language abstract of KR 10-1999-0023618.
English-language abstract of KR 10-2006-0049286.
Korean Office Action dated Jul. 28, 2010, issued in corresponding Korean Patent Application No. 10-2008-0102557.

* cited by examiner

*Primary Examiner* — Thuy Pardo
(74) *Attorney, Agent, or Firm* — Christie, Parker & Hale, LLP

(57) ABSTRACT

A photo sensing device, a photo sensing circuit, a touch panel, and a method of sensing an output value of a photo sensing element, in order to remove the influence of a threshold voltage. The device includes a photo sensing unit generating a sensing current according to an intensity of incident light, a driving unit outputting a driving current according to the sensing current generated by the photo sensing unit, and a scanning unit outputting on a data line the driving current of the driving unit in a first mode corresponding to the photo sensing unit gathering light for a predetermined period of time and outputting the driving current in a second mode corresponding to the photo sensing unit initializing.

2 Claims, 5 Drawing Sheets

PHOTO SENSING DEVICE, PHOTO SENSING CIRCUIT, TOUCH PANEL, AND METHOD OF SENSING OUTPUT VALUE OF PHOTO SENSING ELEMENT

CROSS-REFERENCE TO RELATED APPLICATION

This application claims the benefit of Korean Application No. 10-2008-0102557, filed Oct. 20, 2008, in the Korean Intellectual Property Office, the disclosure of which is incorporated herein by reference.

BACKGROUND OF THE INVENTION

1. Field of the Invention

Aspects of the present invention relates to a photo sensing device, a photo sensing circuit, a touch panel, and a method of sensing an output value of a photo sensing element, whereby the influence of a threshold voltage of a driving transistor is removed.

2. Description of the Related Art

Photo sensing devices are used in various ways in order to detect the presence of incident light and the intensity of a spot of incident light. In particular, photo sensing devices have been recently used in order to recognize a touch position of a photo sensing touch screen.

To achieve this, a photo sensing device uses various photo sensing elements, in particular, photo diodes. Each photo diode generates a current in proportion to the intensity of incident light.

A photo sensing device uses a predetermined driving device or element in order to obtain a current generated due to incident light as an output signal. Generally, a driving transistor operating as a source follower is used as a photo sensing device. In order to turn-on a transistor, a voltage greater than a threshold voltage needs to be applied between a gate terminal and a source terminal. At this time, an output of the transistor can be affected by the threshold voltage. In addition, the threshold voltage can vary according to environmental factors such as temperature, electric field, etc.

Along with the development of small-sized and highly-integrated electronic devices, a photo sensing device having maximum sensitivity in a minimized area is desired.

SUMMARY OF THE INVENTION

Aspects of the present invention provides a photo sensing device, a photo sensing circuit, a touch panel, and a method of sensing an output value of a photo sensing element, whereby a change in an output due to a threshold voltage of a driving transistor outputting a sensing value of a photo sensing element is compensated for.

Aspects of the present invention also provides a photo sensing device, a photo sensing circuit, a touch panel, and a method of sensing an output value of a photo sensing element, whereby the influence of a threshold voltage of a driving transistor is offset by using a small area of the photo sensing device.

According to an aspect of the present invention, there is provided a photo sensing device including a photo sensing unit generating a sensing current according to an intensity of incident light; a driving unit outputting a driving current according to the sensing current generated by the photo sensing unit; and a scanning unit outputting on a data line the driving current of the driving unit in a first mode corresponding to the photo sensing unit gathering light for a predetermined period of time and outputting the driving current in a second mode corresponding to the photo sensing unit initializing. The photo sensing device may further include a sensing data calculating unit calculating an output difference between the first mode and the second mode of the scanning unit, an initialization unit initializing the photo sensing unit, and an output resetting unit initializing the data line.

According to another aspect of the present invention, there is provided a photo sensing circuit including a photo sensing element generating a sensing current according to an intensity of incident light; a driving transistor having a gate terminal, a first terminal, and a second terminal, wherein the gate terminal is connected to a first terminal of the photo sensing element to receive the sensing current, and a first power voltage is applied to the first terminal of the driving transistor to generate a driving current; a scan transistor having a gate terminal, a first terminal, and a second terminal, wherein a scan signal is input to the gate terminal of the scan transistor, the first terminal of the scan transistor is connected to the second terminal of the driving transistor to receive the driving current, and the second terminal of the scan transistor is connected to a data line, and wherein the scan signal turns on the scan transistor in a first mode corresponding to the photo sensing element gathering light for a predetermined period of time and the scan signal has a second sensing value in a second mode corresponding to the photo sensing element initializing. The photo sensing circuit may further include an initialization transistor applying a second power voltage to the first terminal of the photo sensing element in response to an initialization signal input to a gate terminal of the initialization transistor, and a reset transistor applying a third power voltage to the data line in response to a reset signal input to a gate terminal of the reset transistor.

According to another aspect of the present invention, there is provided a touch panel including a cell array comprising a plurality of photo sensing cells including a photo sensing element; a scan controlling unit providing a scan signal having a first mode and a second mode to at least one of the plurality of photo sensing cells, wherein the plurality of photo sensing cells output a first sensing value in a first mode corresponding to the photo sensing element gathering light for a predetermined period of time and a second sensing value in a second mode corresponding to the photo sensing element initializing; a sensing data calculating unit receiving the first sensing value in the first mode and the second sensing value in the second mode through a data line from the plurality of photo sensing cells, and calculating a difference between the first sensing value and the second sensing value; and an initialization controlling unit providing an initialization signal initializing the photo sensing element, wherein each of the plurality of photo sensing cells may include a photo sensing element generating a current according to an intensity of incident light; a driving transistor having a gate terminal, a first terminal, and a second terminal, wherein the gate terminal is connected to a first terminal of the photo sensing element, and a first power voltage is applied to the first terminal; a scan transistor having a gate terminal, a first terminal, and a second terminal, wherein the scan signal is input to the gate terminal of the scan transistor, the first terminal of the scan transistor of the scan transistor is connected to the second terminal of the driving transistor, and the second terminal of the scan transistor is connected to a data line; and an initialization transistor applying a second power voltage to the first terminal of the photo sensing element in response to the initialization signal input to the gate terminal of the initialization transistor. The touch panel may further include an output resetting unit initializing the data line in order to obtain the first sensing value and the second sensing value.

The touch panel may be a combination display and touch panel. To achieve this, the cell array may further include a plurality of emissive cells including an emissive element, and the touch panel may further include a display driving unit driving the plurality of emissive cells.

According to another aspect of the present invention, there is provided a method of sensing an output value of a photo sensing element through a driving transistor, the method including detecting a first output of the driving transistor in a first mode corresponding to the photo sensing element gathering light; detecting a second output of the driving transistor in a second mode corresponding to the photo sensing element initializing; and calculating a difference between the first output and the second output. The method may further include initializing the photo sensing element. The method may further include initializing a data line receiving an output of the driving transistor prior to detecting the first output; and initializing the data line prior to detecting the second output.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
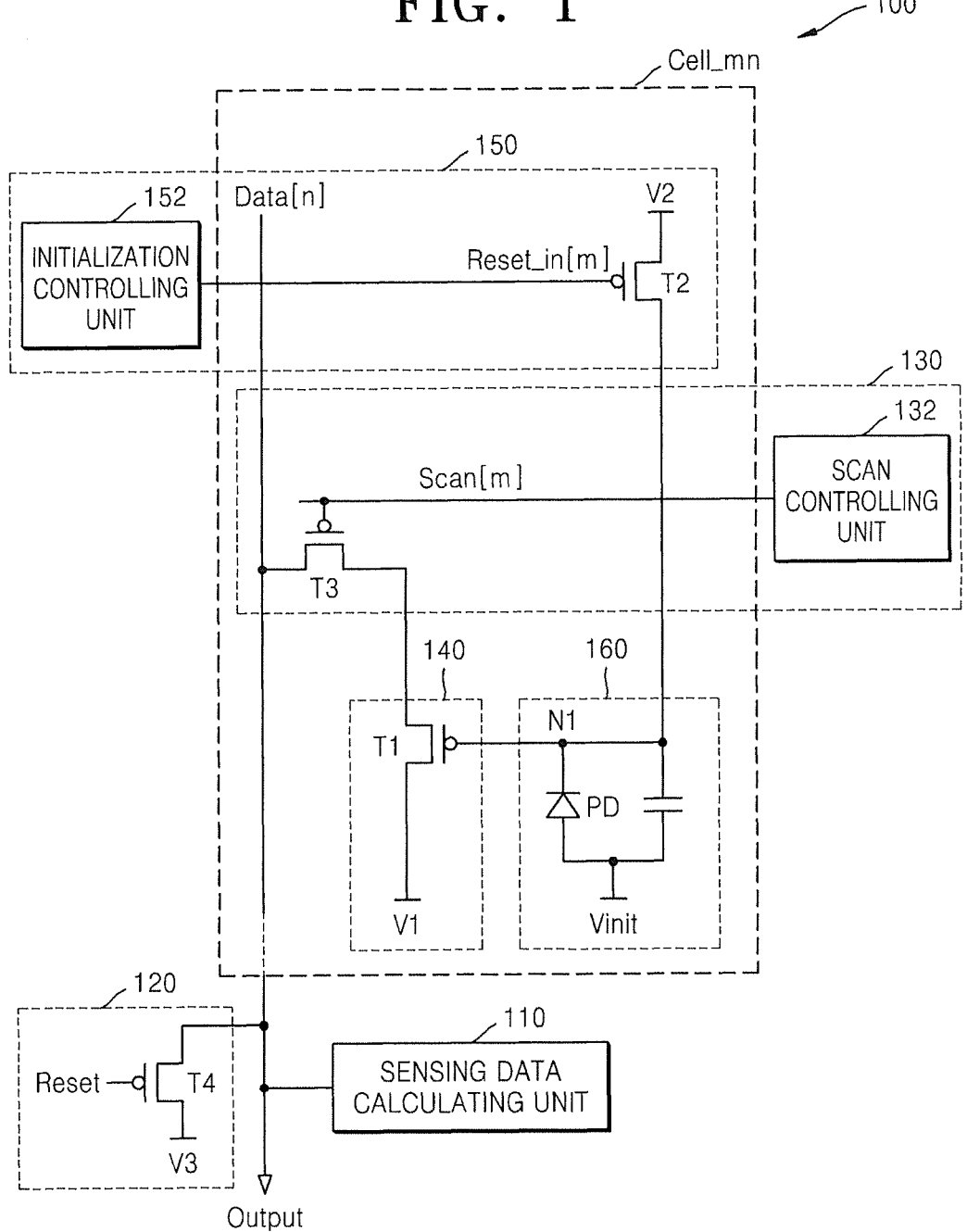
FIG. 1 is a schematic view of a photo sensing device according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The specification and the drawings are not intended to limit aspects of the present invention and the scope of the prevent invention should be defined by the attached claims. The meanings of the terms used in the specification of the present invention should be construed as meanings and concepts not departing from the spirit and scope of the invention based on the principle that the inventor is capable of defining concepts of terms in order to describe his or her invention in the most appropriate way.

Aspects of the present invention will now be described more fully with reference to the accompanying drawings, in which exemplary embodiments of the invention are shown.

FIG. 1 is a schematic view of a photo sensing device 100 according to an embodiment of the present invention.

The photo sensing device 100 includes a scanning unit 130, a driving unit 140, and a photo sensing unit 160. When light is incident on the photo sensing unit 160, the photo sensing unit 160 outputs a current according to the intensity of the incident light, the driving unit 140 outputs a value according to the current output from the photo sensing unit 160, and the scanning unit 130 outputs an output in response to a scan signal for a predetermined period of time. In the present embodiment, scanning is performed twice during every photo sensing period.

The photo sensing unit 160 generates a current according to the intensity of the incident light. At this time, if the intensity of the incident light is higher, a stronger current is generated. To achieve this, the photo sensing unit 160 may include a predetermined photo sensing element, for example, a photo diode. The photo sensing device is not limited to any particular device as long as the photo sensing device generates a current according to the intensity of incident light.

The driving unit 140 receives and outputs a value based on the current generated by the photo sensing unit 160, which is based on the incident light. Generally, since the value output from the photo sensing unit 160 is a signal of very small intensity, the driving unit 140 may amplify the value output from the photo sensing unit 160 and outputs the amplified value.

The scanning unit 130 outputs a sensed value of the driving unit 140 twice during every photo sensing period. The scanning unit 130 outputs a current of the driving unit 140 in a first mode when light is gathered on the photo sensing unit 160 and in a second mode when the photo sensing unit 160 is initialized. To achieve this, the scanning unit 130 includes a scan controlling unit 132 outputting a scan signal.

The photo sensing device 100 may further include a sensing data calculating unit 110 calculating an output difference between the first mode and the second mode. According to the present embodiment, in order to calculate the output difference between the first mode and the second mode, the intensity of light incident on the photo sensing unit 160 is measured, and the sensing data calculating unit 110 calculates the output difference. The sensing data calculating unit 110 may include a storage unit (not shown) storing output values of the first mode and/or the second mode, and a calculation unit (not shown) calculating the output difference between the first and second modes. The calculation unit may be embodied as software, hardware, or a combination of software and hardware.

The photo sensing device 100 may further include an initialization unit 150 initializing the photo sensing unit 160. According to the present embodiment, in order to compensate for a variation in an output value due to a change of a threshold voltage of the driving unit 140, the output difference between the first and second modes is calculated. At this time, in order to obtain the output value indicating the effect of the threshold voltage, an output of the photo sensing unit 160 that is initialized is obtained. At this time, prior to the second mode, and after the first mode when light is gathered on the photo sensing unit 160, in order to initialize the photo sensing unit 160 during every photo sensing period, for example, every frame, the initialization unit 150 applies an initialization voltage to the photo sensing unit 160.

The photo sensing device 100 may further includes an output resetting unit 120 initializing a data line outputting a current of the scanning unit 130. Generally, the data line for applying input data or output data includes a capacitor element. A voltage level of the data line varies according to the capacitor element. The output resetting unit 120 initialize the data line by applying a predetermined voltage to the data line in order to remove a value stored in the capacitor element of the data line whenever obtaining new input data or output data. The output resetting unit 120 initializes the data line whenever the output values of the first and second modes are obtained.

The photo sensing unit 160, the driving unit 140, the scanning unit 130, the initialization unit 150 and the output resetting unit 120 may be embodied using transistors and photo diodes, as illustrated in FIG. 1.

Figure 3:
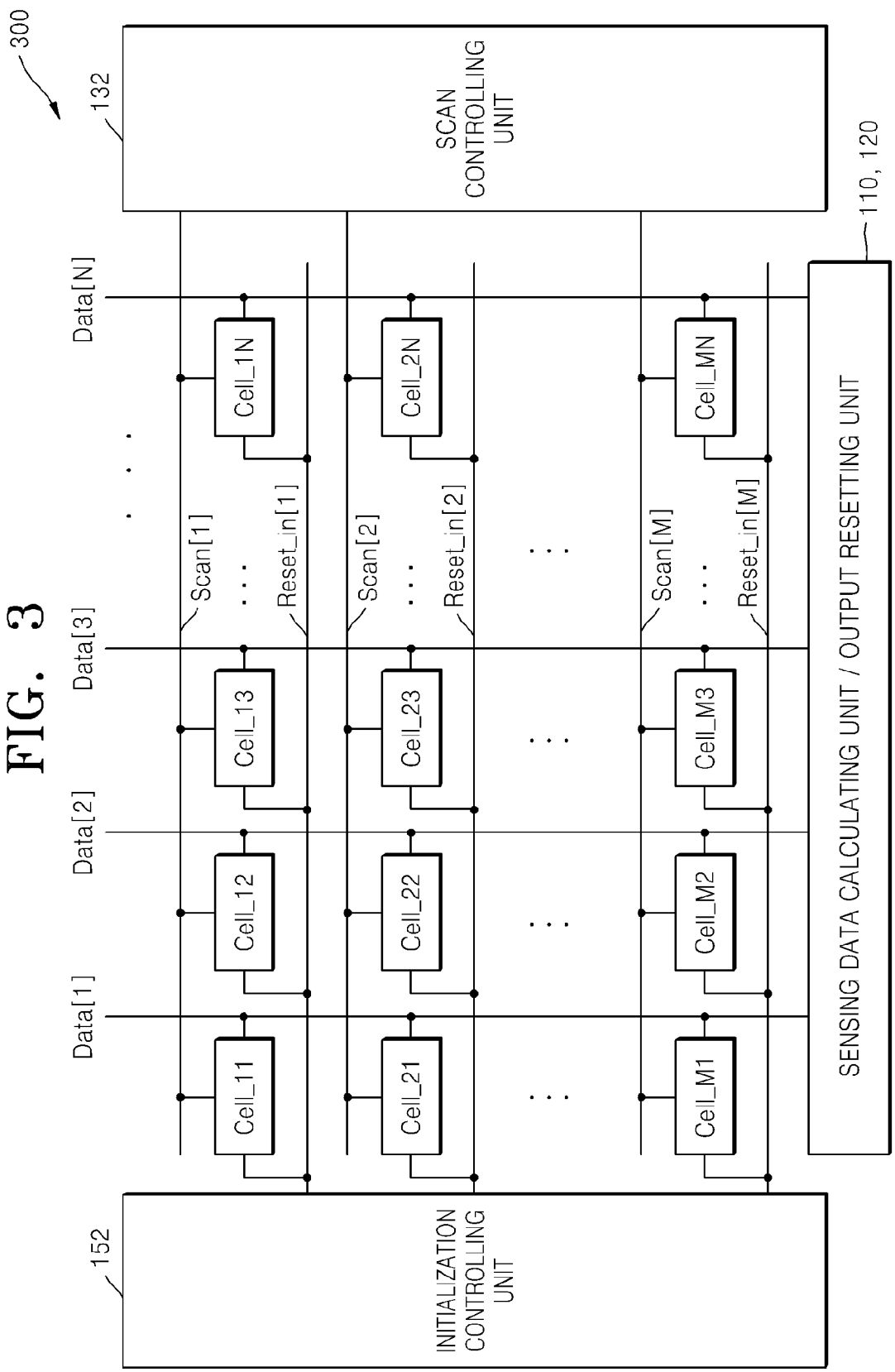
FIG. 3 is a structural view of a touch panel including photo sensing circuits, according to an embodiment of the present invention.

In addition, the photo sensing device 100 may be embodied in a cell array shape, as illustrated in FIG. 3 and a unit denoted by Cell_mn of FIG. 1 is repeatedly arranged, as illustrated in FIG. 3.

Figure 2:
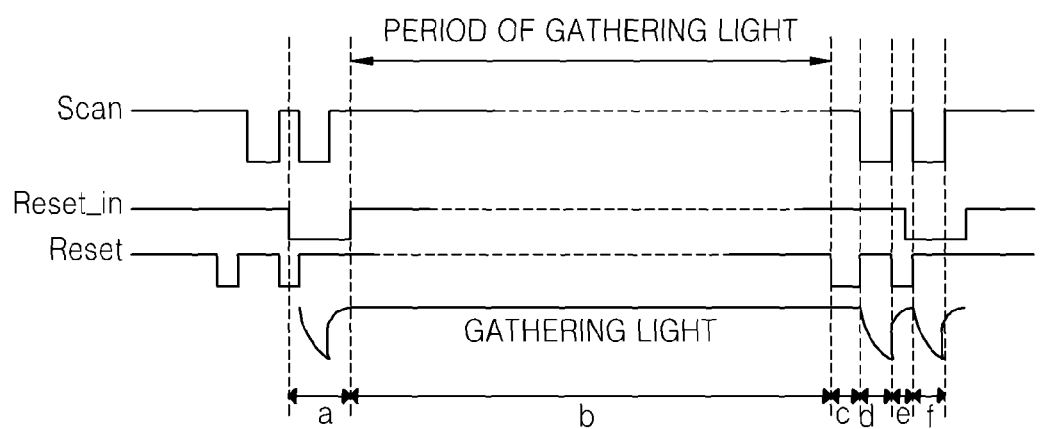
FIG. 2 is a timing diagram showing control signals applied to a photo sensing circuit and data output from the photo sensing circuit, according to an embodiment of the present invention.

FIG. 2 is a timing diagram showing control signals applied to a photo sensing circuit and data output from the photo sensing circuit, according to an embodiment of the present invention. With reference to FIG. 2, an operation of the photo sensing circuit will be described.

The photo sensing device 100 initializes a photo diode PD ("a"). To achieve this, an initialization signal Reset_in[m], generated by an initialization controlling unit 152, is applied to an initialization transistor T2. When the initialization signal Reset_in[m] is applied to the initialization transistor T2, a second power voltage V2 is applied to an end of the photo diode PD so that a voltage of the end of the photo diode PD is set to a predetermined voltage. Thus, a driving transistor T1 and the photo diode PD are initialized.

When a voltage of the end of the photo diode PD is set to a predetermined voltage, the photo diode PD gathers light for a period of gathering light ("b"). During the gathering of light, a gate electrode voltage of the driving transistor T1 varies. At this time, a current is generated in the photo diode PD due to incident light. An amount of the current is determined according to the intensity of the incident light. Thus, the current flows through the initialization transistor T2 and the photo diode PD, and an electric potential of a node N1 is determined according to the amount of current.

When the period of gathering light is over, a reset transistor T4 is turned-on by a reset signal Reset in order to initialize the data line Data[n] ("c"). When the reset transistor T4 is turned-on, a third power voltage V3 is applied to the data line Data[n] so that the data line Data[n] is charged with a predetermined value.

In order to obtain the output of the first mode by the photo diode PD in which light is gathered, a scan transistor T3 is turned-on by a scan signal Scan[m] ("d"). With the turning-on the scan transistor T3 by the scan signal Scan[m], the value charged in the data line Data[n] is applied to a source of the driving transistor T1. A current corresponding to a gate voltage of the driving transistor T1 flows through the scan transistor T3 and the driving transistor T1. Due to the current, a voltage of the data line Data[n] is determined, and the sensing data calculating unit 110 outputs the output of the first mode. That is, the output of the first mode is a value of a point of the data line Data[n] at which a period 'd' is over. At this time, the gate voltage of the driving transistor T1 is a voltage of the node N1, according to the intensity of incident light. The gate electrode voltage of the driving transistor T1 is not fixed to an initial value, and varies with light gathering. A value Vgs of the driving transistor T1 is determined by the gate electrode voltage determined by light gathering. That is, a value of the data line Data[n] reflects a drop in voltage due to light gathering instead of reflecting only a threshold voltage Vth of the driving transistor T1.

After obtaining the output of the first mode, the scan transistor T3 is turned-off again, the data line Data[n] is initialized again by the reset signal Reset ("e").

Then, the photo diode PD is initialized, and an output of the second mode is obtained from the photo diode PD ("f"). To achieve this, before the scan signal Scan[m] is applied in order to obtain the output of the second mode, the photo diode PD is initialized. That is, the initialization signal Reset_in[m] is applied to a gate of the initialization transistor T2 so that the second power voltage V2 is applied to the photo diode PD. At this time, the driving transistor T1 is turned-on, and the value of the data line Data[n] drops, reflecting the threshold voltage Vth of the driving transistor T1. The output of the data line Data[n], when a period 'f' is over, is determined by a current flowing through the scan transistor T3 and the driving transistor T1, which is generated by the photo diode PD that is initialized. When the photo diode PD is initialized, the sensing data calculating unit 110 obtains the output of the second mode from the output of the data line Data[n].

When the outputs of the first mode and the second mode are determined, the sensing data calculating unit 110 outputs an output difference between the first mode and the second mode to determine sensing data.

When the current generated by the photo diode PD is output through the driving transistor T1, an output current of the driving transistor T1 is reduced by the threshold voltage Vth of the driving transistor T1. Generally, since data obtained from the photo diode PD has a very small value, the threshold voltage Vth greatly affects the sensing data. In addition, since the threshold voltage Vth is affected by temperature and electromagnetic field, when the photo sensing circuit is arrange in a cell array type, the threshold Vth may vary for each respective cell. According to the present embodiment, since the outputs of the first mode and the second mode are respectively obtained by two scanning operations, and the sensing data is determined by the output difference between the first and second modes, the influence of the threshold voltage Vth can be removed from the sensing data.

FIG. 3 is a structural view of a touch panel 300 including photo sensing circuits, according to an embodiment of the present invention.

The photo sensing circuits are arranged as illustrated in FIG. 3 to embody the touch panel 300 calculating a touch position of a screen, which is touched by a user. The initialization controlling unit 152 generates the initialization signal Reset_in[m] for initializing the photo diode PD. The scan controlling unit 132 turns-on the scan transistor T3, and generates the scan signal Scan[m] for obtaining the output of the data line Data[n]. The scan signal Scan[m] and the initialization signal Reset_in[m] may be commonly applied to cells of the same line.

The sensing data calculating unit 110 obtains the output of the data line Data[n] by the scan signal Scan[m]. The data line Data[n] may be commonly connected to cells of the same column. The output resetting unit 120 may be embodied by the reset transistor T4 connected to the data lines Data[1], Data[2], . . . , Data[N].

The touch panel 300 may be used as a touch panel using internal light and a touch panel using external light. For example, in the touch panel using external light, the touch position can be seen by detecting a position at which the intensity of the incident light is small.

In FIG. 3, the initialization controlling unit 152, the scan controlling unit 132 and the sensing data calculating unit 110 are separately arranged, but aspects of the present invention are not limited. Alternatively, at least one of the initialization controlling unit 152, the scan controlling unit 132 and the sensing data calculating unit 110 may be integrated to embody a single driving circuit.

Figure 4:
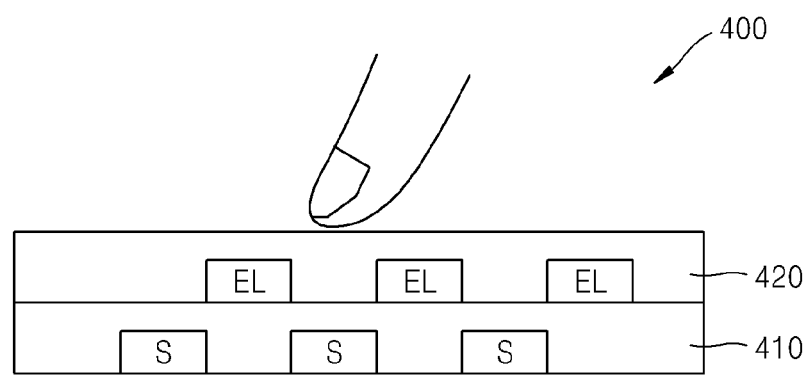
FIG. 4 illustrates a stack structure of a combination display and touch panel according to an embodiment of the present invention.

FIG. 4 illustrates a stack structure of a combination display and touch panel 400 according to an embodiment of the present invention.

The photo sensing circuit may be used in the combination display and touch panel 400. In the combination display and touch panel 400, both functions of touch-screen and displaying can be provided by a single panel instead of a stacked display panel and a touch panel.

The combination display and touch panel 400 may include a photo sensing layer 410 and an emissive layer 420. A photo sensing cell S and an emissive cell EL may be alternately arranged, as illustrated in FIG. 4. However, the stack structure of FIG. 4 is only an example of the combination display and touch panel 400, and it will be understood by one of ordinary skill in the art that various changes may be made. For example, the photo sensing cell S and the emissive cell EL may be formed on the same plane, or may be formed in the same cell.

Figure 5:
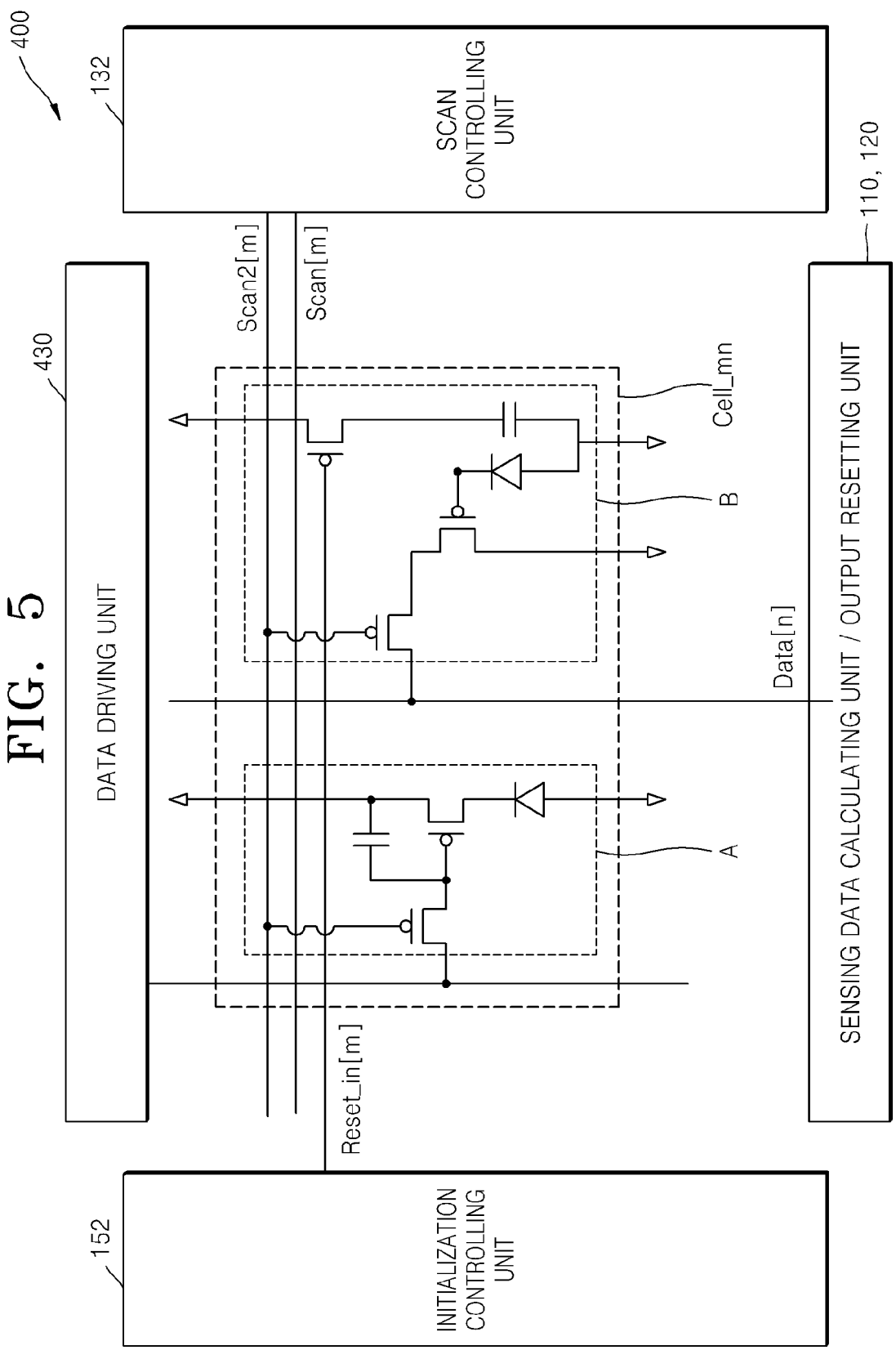
FIG. 5 is a structural view of a combination display and touch panel according to another embodiment of the present invention.

FIG. 5 is a structural view of a combination display and touch panel 400, according to another embodiment of the present invention.

Referring to FIG. 5, an emissive cell EL and a photo sensing cell S are formed in a single cell. A cell Cell_mn includes an emissive circuitry A and a photo sensing circuitry B. The emissive circuitry A of FIG. 5 emits light via an organic light emitting device (OLED). However, aspects of the present invention are not limited thereto. That is, aspects of the present invention may be applied to all displaying technologies such as liquid crystal display (LCD) and plasma display panel (PDP) technologies.

The combination display and touch panel 400 includes a data driving unit 430 providing input data to the emissive circuitry A and a driving unit providing a display scanning signal Scan2[m] to the emissive circuitry A. In FIG. 5, the scan controlling unit 132 provides the display scanning signal Scan2[m] together with a scan signal Scan[m] for the photo sensing circuitry B. Since the scan signal Scan[m] for the photo sensing circuitry B is scanned twice during every photo sensing period, the display scanning signal Scan2[m] may be separately provided from the scan signal Scan[m] for the photo sensing circuitry B. However, aspects of the present invention are not limited thereto. Alternatively, the scan signal Scan[m] may be commonly provided to the emissive circuitry A and the photo sensing circuitry B, and the scan signal Scan[m] is processed by the emissive circuitry A.

According to aspects of the present invention, sensing data is obtained by calculating a difference between two outputs, thereby removing the influence of a threshold voltage.

Moreover, since the gain of a photo sensing circuit is close to 1, a distribution due to amplification of a data value is reduced, so that a stable data value can be obtained.

In addition, since a simple structure is used for removing the influence of a threshold voltage, the size of a photo diode can be maximized.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of sensing an output value of a photo sensing element through a driving transistor, the method comprising:
gathering energy from light at the photo sensing element;
after the gathering of energy from light at the photo sensing element, initializing a data line configured to receive an output of the driving transistor, to a first voltage;
after the initializing of the data line to the first voltage, detecting a first output of the driving transistor in a first mode corresponding to the gathering of energy from light at the photo sensing element;
after the detecting of the first output of the driving transistor, reinitializing the data line to the first voltage and initializing the photo sensing element;
after the reinitializing of the data line to the first voltage and the initializing of the photo sensing element, detecting a second output of the driving transistor in a second mode corresponding to the initializing of the photo sensing element; and
calculating a difference between the first output and the second output.

2. The method of claim 1, wherein the initializing of the photo sensing element and the initializing of the data line comprise applying an electrical signal to the photo sensing element and the data line.

* * * * *